United States Patent
Ryynänen et al.

(10) Patent No.: US 7,976,230 B2
(45) Date of Patent: Jul. 12, 2011

(54) ACTUATOR MECHANISM AND A SHUTTER MECHANISM

(75) Inventors: Matti Ryynänen, Helsinki (FI); Joonas Ryynanen, legal representative, Helsinki (FI); Tessa Ryynanen, legal representative, Helsinki (FI); Anssi Vänskä, Helsinki (FI); Matti Kosonen, Järvenpää (FI); Ilpo Kauhaniemi, Vantaa (FI); Sami Myyryläinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/798,657

(22) Filed: Apr. 7, 2010

(65) Prior Publication Data
US 2010/0196001 A1      Aug. 5, 2010

Related U.S. Application Data

(62) Division of application No. 11/404,501, filed on Apr. 13, 2006, now Pat. No. 7,708,478.

(51) Int. Cl.
*G03B 9/08*        (2006.01)
*H02N 10/00*       (2006.01)
*F02G 1/04*        (2006.01)

(52) U.S. Cl. .................. 396/463; 318/117; 60/528

(58) Field of Classification Search .................. 396/463, 396/493; 60/528; 310/307; 318/117; 148/563, 148/402
See application file for complete search history.

(56) References Cited

U.S. PATENT DOCUMENTS

| | | | | |
|---|---|---|---|---|
| 2,571,756 A * | 10/1951 | Pribus | ............................ | 396/493 |
| 3,883,885 A * | 5/1975 | Orlando | ........................ | 396/496 |
| 4,696,560 A | 9/1987 | Ogihara et al. | | |
| 4,777,394 A | 10/1988 | Hayashi | | |
| 4,860,040 A * | 8/1989 | Tamamura et al. | ............. | 396/89 |
| 4,887,430 A * | 12/1989 | Kroll et al. | ....................... | 60/527 |
| 5,017,954 A * | 5/1991 | Harvey | ......................... | 396/493 |
| 5,062,175 A * | 11/1991 | Buchanan et al. | ........ | 15/250.203 |
| 5,150,702 A * | 9/1992 | Miyanaga et al. | ............ | 600/181 |
| 5,172,158 A | 12/1992 | Morino et al. | | |
| 5,173,728 A | 12/1992 | Sangregory et al. | | |
| 5,264,896 A | 11/1993 | Lee et al. | | |
| 6,157,779 A * | 12/2000 | Kosaka et al. | .................. | 396/55 |
| 6,443,635 B1 | 9/2002 | Matsumoto et al. | | |
| 6,516,146 B1 * | 2/2003 | Kosaka | ........................... | 396/55 |
| 6,832,477 B2 * | 12/2004 | Gummin et al. | ................ | 60/527 |

(Continued)

FOREIGN PATENT DOCUMENTS
EP       1626177       2/2006
(Continued)

OTHER PUBLICATIONS

Extended European Search Report mailed Nov. 10, 2010 in parallel European Patent Application No. 07730681.9 (9 pages).

(Continued)

*Primary Examiner* — W. B. Perkey

(57) ABSTRACT

In one example, an actuator mechanism comprising: one or more coils for establishing a magnetic field; a rotating permanent magnet, which has at least one extreme position depending on the magnetic field; and driving members, which are coupled to the permanent magnet and by means of which the members coupled to the actuator mechanism are driven. In another example, an actuator mechanism comprising: one or more wires, which are manufactured of a shape memory alloy that shrinks when heated; and driving members, which are coupled to said wire and by means of which the members connected to the actuator mechanism are driven.

20 Claims, 6 Drawing Sheets

U.S. PATENT DOCUMENTS

| | | | |
|---|---|---|---|
| 7,021,055 B2 * | 4/2006 | Gummin et al. | 60/527 |
| 7,242,123 B2 | 7/2007 | Miyawaki | |
| 7,410,310 B2 | 8/2008 | Kihara | |
| 2004/0170423 A1 | 9/2004 | Kudo et al. | |
| 2005/0146233 A1 | 7/2005 | Miyawaki | |
| 2007/0138884 A1 | 6/2007 | McMillan et al. | |

FOREIGN PATENT DOCUMENTS

| | | | |
|---|---|---|---|
| JP | 2241990 | | 9/1990 |
| JP | 3-157634 | * | 7/1991 |
| JP | 3157634 | | 7/1991 |
| JP | 3284806 | | 12/1991 |
| JP | 2001249375 | | 9/2001 |
| JP | 20030015186 | | 1/2003 |
| JP | 2005017329 | | 1/2005 |
| JP | 2005134438 | | 5/2005 |

OTHER PUBLICATIONS

Patent Abstracts of Japan, Japanese Publication No. 2001-249375, published Sep. 14, 2001, Fuji Photo film Co. Ltd. (1 page).

International Search Report dated Jul. 31, 2007 in parallel International Application No. PCT/FI2007/050194 (8 pages).

English Abstract of Japanese Publication No. 3284806, published Dec. 16, 1991 (1 page).

English Abstract of Japanese Publication No. 2003-015186, published Jan. 15, 2003, Cannon Denschi KK (i page) plus machine translation thereof (8 pages).

English Abstract of Japanese Publication No. 3157634, published Jul. 5, 1991, Seikosha KK (1 page).

English Abstract of Japanese Publication No. 2005-017329, published Jan. 20, 2005, Nitto Optical (1 page) plus machine translation thereof (9 pages).

English Abstract of Japanese Publication No. 2005-134438, published May 26, 2005, Kyocera Corp. (1 page) plus machine translation thereof (17 pages).

English Abstract of Japanese Publication No. 2241990, published Sep. 26, 1990, Matsushita Electric Ind. Co. Ltd. (1 page).

* cited by examiner

ACTUATOR MECHANISM AND A SHUTTER MECHANISM

CROSS REFERENCE TO RELATED APPLICATION

This application is a divisional of application Ser. No. 11/404,501 filed on Apr. 13, 2006 now U.S. Pat. No. 7,708,478 and claims domestic priority under 35 U.S.C. §120.

BACKGROUND OF THE INVENTION

1. Field of the Invention

The invention relates to an actuator mechanism, which comprises an actuator, by means of which is achieved a suitable movement for the mechanism itself or such other mechanism, to which the actuator mechanism is coupled. The invention relates to a shutter mechanism, which applies the actuator mechanism and which in accordance with a specific example is used to protect the desired object. The invention also relates to a shutter mechanism protecting optics or some other object. The invention relates to a shutter mechanism for electronic devices, especially for portable terminals, such as mobile phones, which are also equipped with optics.

2. Related Background Art

Cameras have been placed in mobile terminals, for example mobile phones, where the optics and lenses of cameras require protection, for example, against environmental conditions or mechanical effects. It is necessary to protect against these effects so that the quality of images does not deteriorate because of contamination or damaging of the lens. Terminals are often equipped with manually transferable covers or shields, but their size is often too large and limits the construction and design of the terminal.

In addition, in conventional cameras it is known to use electrical or mechanical shutter constructions, which are activated when the device is switched on or when it is used. In cameras the operation of the shutter construction is often coupled to the operation of the zoom device of the camera, in which case the movement of the optics also opens the shield.

The devices according to prior art are laborious to use or unsuitably large in their size so that they could be used, for example, in mobile phones or similar portable devices, which comprise phone call properties and camera function. The small size of the devices, usability, and design aspects significantly limit the construction of a functional shutter construction. The mechanisms used in conventional cameras are not suitable for mobile phones either, because there often are no moving parts in the optics.

SUMMARY OF THE INVENTION

A purpose of the invention is to define a construction for a shutter mechanism, which is small enough to be used, for example, in protecting the optics of mobile terminals.

The construction of the invention can be integrated into a device, the construction is thin and compact. According to an example of the construction, it is constructed around the aperture to be protected, for example in the shape of a ring, in which case the optics to be protected, the lens or other object requiring protection is placed at the opening. The different parts of the construction are placed in a manner that enables a structure that is thin and small in diameter.

In addition, a purpose of the invention is to define an actuator mechanism, which is applicable in constructing a shutter mechanism. A purpose of the actuator mechanism is to achieve one of more stable and controlled positions, for example, for the shutter mechanism. When the actuator mechanism provides a stable position, for example movement of the shutter mechanism by accident or on purpose, for example manually by means of a hand or a finger or due to vibration, is prevented to the desired extent. In addition, a purpose is to provide stable positions, to which the construction moves, for example in the situation when electricity supply has stopped. Due to the stable positions, the operation of, for example, the shutter mechanism is accurate, and the shutter mechanism is not moved partly in front of the optics. A purpose of the invention is to lock the mechanism in the desired positions.

A purpose of the invention is to achieve an actuator mechanism and a shutter mechanism, whose operation is accurate, in other words the means protected by them are either entirely on top of the object to be protected or entirely away from it. In addition, a purpose of the invention is a mechanism, which operates accurately despite, for example, manual effects. In addition, a purpose of the invention is a mechanism, which allows a manual transfer, but if necessary also remains in its determined extreme positions. A purpose of the invention is to enable manual usage and opening of the locking without braking the device, in which case the mechanism is constructed in such a manner, that it resists the changing of the position, but finally allows it to change, if the effective force is sufficient. On the other hand, a purpose of the invention is a construction, whose electrical operation is not disturbed and is capable of returning to normal operation, even though, for example, the position of the shutter blade has been changed manually.

DETAILED DESCRIPTION OF THE INVENTION

Figure 1:
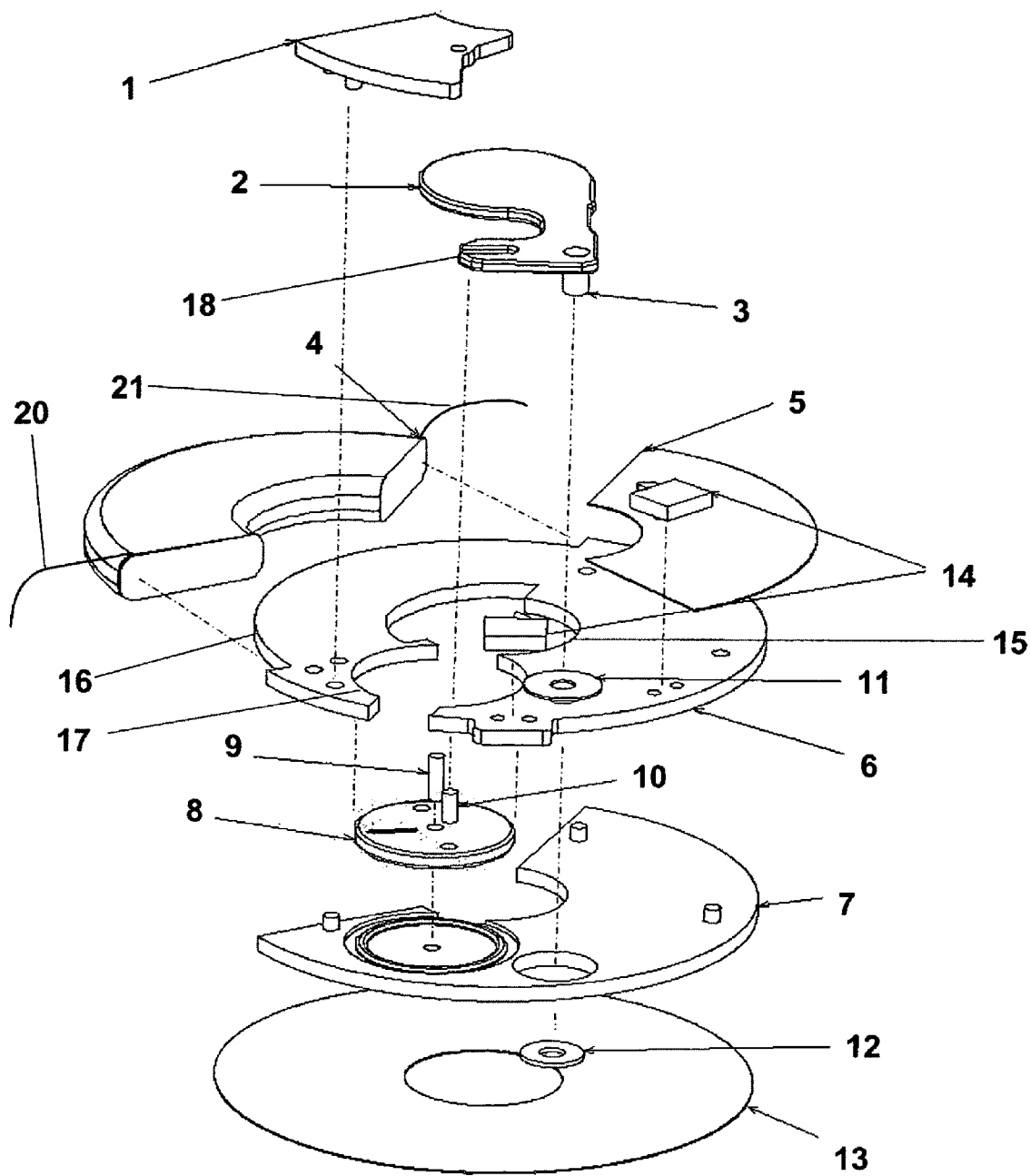
FIG. 1 shows an actuator mechanism and a shutter mechanism implemented with it according to a first embodiment of the invention.
Figure 5:
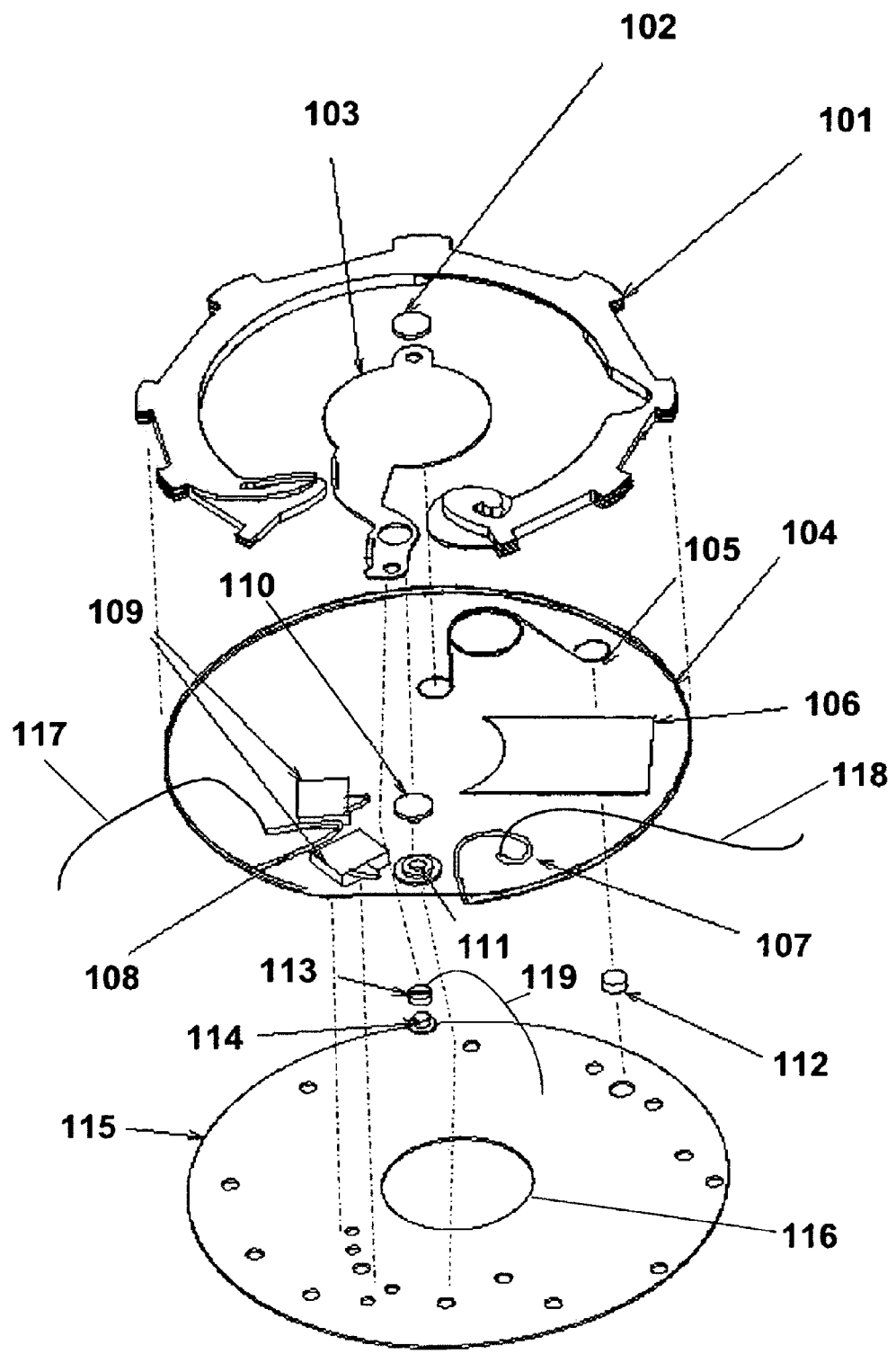
FIG. 5 shows an actuator mechanism and a shutter mechanism implemented with it according to a fourth embodiment of the invention.

FIGS. 1 and 5 show actuator mechanisms. An actuator mechanism is used for protecting lenses of electronic devices, preferably cameras. The lens of a camera can also be installed in a portable phone, i.e. a mobile phone, which operates, for example, in a mobile phone network based on a cellular system.

With reference to FIG. 1, the reference number 8 denotes a permanent magnet. A permanent magnet 8 is a thin, round disc, which, being known as such, defines a static magnetic field, which comprises two poles (N-pole, S-pole), which are located at different ends of the disc. The reference number 9 denotes a center pin, which is in the center of the permanent magnet 8, and the reference number 10 denotes a driving pin, which is in the permanent magnet 8. The permanent magnet 8 rotates around the rotation axis defined by the center pin 9. The driving pin 10 is attached to the permanent magnet 8 and it rotates together with the permanent magnet 8. The driving pin 10 is an example of driving members, which are attached to the permanent magnet 8 and which move the other parts attached to the actuator mechanism. The more detailed configuration of the driving members can vary even widely according to needs.

The reference number 4 denotes a coil and reference number 6 denotes a stator, which is established by means of the coil 4. In the example of FIG. 1 the stator 6 forms a closed magnetic circuit in the form of a ring, which has two opposite ends. The permanent magnet 8 is located between the opposite ends of the stator 6, separated by gaps between each end of the stator 6 and the permanent magnet 8. The reference number 15 denotes an aperture that is closed or protected, being placed in the center of the stator 6. The stator 6 is a thin plate, around which the coil 4 is wrapped. A tapered portion 16 is cut in the stator 6, in which portion the coil 4 settles so that the width of the coil 4 would not exceed that of the stator 6 and if it is necessary for optimizing the size. The coil 4 can also be placed somewhere else, where it is optimal from the point of view of the magnetic circuit. Alternatively, the coil is placed in an area, where the cross-section of the stator is the largest, or close to the permanent magnet 8. By aiming for as small a stator as possible, it is possible to optimize the weight of the mechanism and to lighten the structure. The actuator mechanism forms a substantially round and thin structure with a certain radius, inside which the different parts are located. The closable aperture 15 is located in the center of the actuator mechanism.

When current is supplied to the coil 4 by means of terminals 20 and 21, the stator 6 is established with the consequence that the permanent magnet 8 and the driving pin 10 turn to a predetermined angle. When the stator 6 is established, it defines a magnetic field, which comprises two poles (N-pole, S-pole), which are located at different ends of the stator 6. The direction of the magnetic field and the location of the S and N poles depends on how the current is coupled to the coil 4 and what the direction of the current is. Current can be connected to the coil 4 in two ways, in which case two different directions of the magnetic field are created and the placement of the poles changes. If the S-poles (or N-poles) of the stator 6 and the permanent magnet 8 are next to each other, they repel and thus the permanent magnet 8 tends to turn around the center pin 9 in such a manner that the S-pole of the stator 6 and the N-pole of the permanent magnet 8 are next to each other, by turning the driving pin 10. The S-pole of the stator 6 and the N-pole of the permanent magnet 8 attract each other. The stator 6 is manufactured for example of ferromagnetic material, which is magnetized by the effect of the magnetic field of the permanent magnet 8. The magnetic interaction of the ferromagnetic stator 6 and the permanent magnet 8 results in that the permanent magnet has one or more stable positions when the current supply ends. The position of the shutter blade 2 is stable in the example even when the current supply ends, because the magnetic field of the stator 6 keeps the permanent magnet 8 in the desired position.

The reference number 2 denotes a shutter blade and the reference number 3 denotes a pin that is in the shutter blade 2. The shutter blade 2 rotates around the rotation axis defined by the pin 3. The pin 3 is attached to the shutter blade 2. The pin 3 settles in the aperture in the stator 6, where the pin 3 is allowed to rotate. There is a washer 11 around the pin 3, which washer settles between the shutter blade 2 and the stator 6. The pin 3 is locked in its place by a locking washer 12, which locks to the pin 3 and settles against the stator 6. The washer 11 and the locking washer 12 settle on opposite sides of the stator 6.

The reference number 7 denotes a base plate. The base plate 7 sets next to the stator 6 and leaves the aperture 15 free. The base plate 7 is equipped with locating pins, which set into holes in the stator 6. There is an aperture in the base plate 7 at the washer 12 and the locking washer 12 settles into this aperture next to the stator 6. The base plate 7 does not extend to that area of the stator 6 where the coil 4 is, and it does not settle next to the coil 4 so that the thickness of the actuator mechanism does not increase. The base plate 7 extends next to the permanent magnet 8 and a nest is formed in it, wherein the permanent magnet 8 can rotate. The center pin 9 extends to the aperture in the washer 12.

The permanent magnet 8 is closed into its place by means of a magnet holder 1. The permanent magnet 8 settles between the base plate 7 and the magnet holder 1. The magnet holder 1 attaches to the stator 6. The magnet holder 1 is equipped with locating pins, which settle into holes in the stator 6. The center pin 9 extends to the aperture in the magnet holder 1. The magnet holder 1 does not extend to that area of the stator 6 where the coil 4 is. The magnet holder 1 and the driving pin 10 are located on the same side of the stator 6 and the magnet holder 1 allows the movement of the driving pin 10, which is shaped like an arc. The magnet holder 1 defines a sector aperture, which covers the movement of the driving pin 10. In an example the edges of the sector aperture define the extreme points of the allowed movement of the driving pin 10 and stop the permanent magnet 8. In the example the magnet holder 1 defines a sector aperture, whose angle is 120 degrees with the center pin as the midpoint.

Figure 4A:
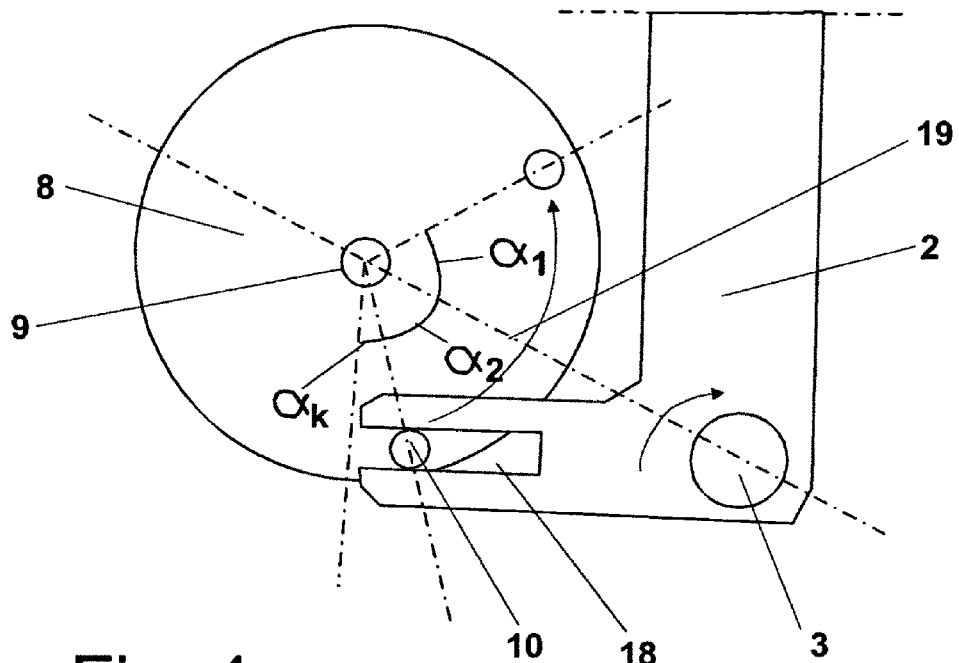
FIG. 4a shows an actuator mechanism according to a second embodiment of the invention.

According to FIG. 4a, the pin 3 is located on line 19, which runs through the center pin 9 and the center line of the sector aperture. The center line divides the sector aperture into two equal sectors (angles $\alpha 1$ and $\alpha 2$), in the example into two sectors of 60 degrees. The angles can also be different depending on the selected geometry. In the example, the angle $\alpha k$ is 16.8 degrees and the distance h is 8 mm. The driving pin 10 moves between the center pin 9 and the pin 3 by crossing said center line. The shutter blade 2 and a long aperture 18 move between the center pin 9 and the pin 3. There is a long aperture 18 in the shutter blade 2, into which the center pin 10 slides. When the permanent magnet 8 rotates, the driving pin 10 slides along the long aperture 18 and turns the shutter blade 2 around the pin 3. In the example the long aperture 18 is open in one of its ends and forms a fork, whose width corresponds to the width of the driving pin 10. The length of the long aperture 18 allows the permanent magnet 8 to move from one extreme position to another.

The pin 3 or the rotation center of the shutter blade 2 can also be placed in some other point that is the most appropriate one in each case from the point of view of the compactness of the structure or the operation of the mechanism. The size of the shutter blade 2 and the desired path of movement define the geometry, where the driving pin 10, the aperture 18 and the pin 3 are located. The pin 3 can also be attached to some other part than the stator 6, for example to a base plate 7, if it is necessary from the point of view of optimization.

Figure 4B:
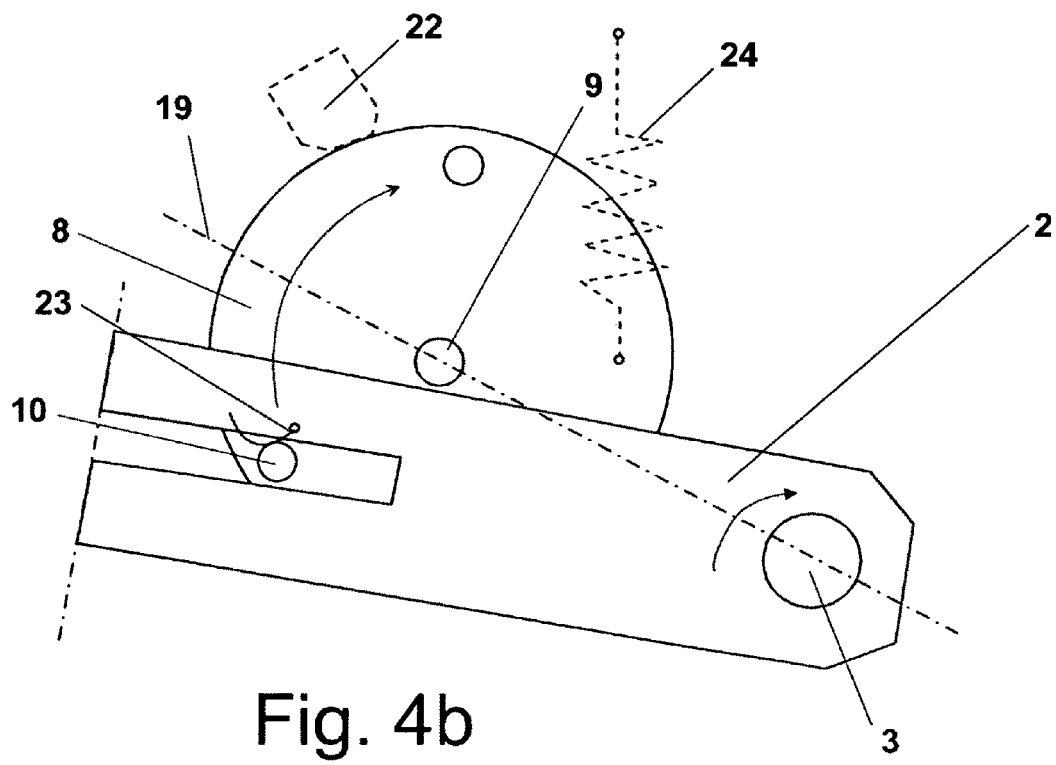
FIG. 4b shows an actuator mechanism according to a third embodiment of the invention.

FIG. 4b shows another embodiment, which operates in the same manner as the example of FIG. 4a, but the driving pin 10 runs over line 19 on the opposite side of the permanent magnet 8 in relation to the center pin 9. Thus, the fork crosses the center pin 9. The form of the shutter blade 2 varies depending on where the pin 3 is settled, as well as the location of the center pin 10. Preferably the shutter blade 2 forms an angle at the pin 3, in which case the structure is made smaller, because the pin 3 is located next to the permanent magnet 8, not between the permanent magnet 8 and the aperture 15. FIG. 4b shows an alternative structure of the shutter blade 2, where the aperture 18 is placed in the frame of the shutter blade 2 and not in the additional branch as in FIG. 4a.

In FIG. 1 the shutter blade 2 covers the aperture 15 in one extreme position of the permanent magnet 8 and is moved away from the aperture 15 in another extreme position of the permanent magnet 8. The shutter blade 2 settles next to the stator 6, but there is a slipway 5 between the stator 2 and the shutter blade 2, along which the shutter blade 2 slides easily. The slipway 5 is attached to the stator 6. In the example the slipway 5 is of small-friction plastic material. A masking tape 13 is attached on the base plate 7 and the coil 4, which tape is shaped like a ring and leaves the aperture 15 free.

Figure 2:
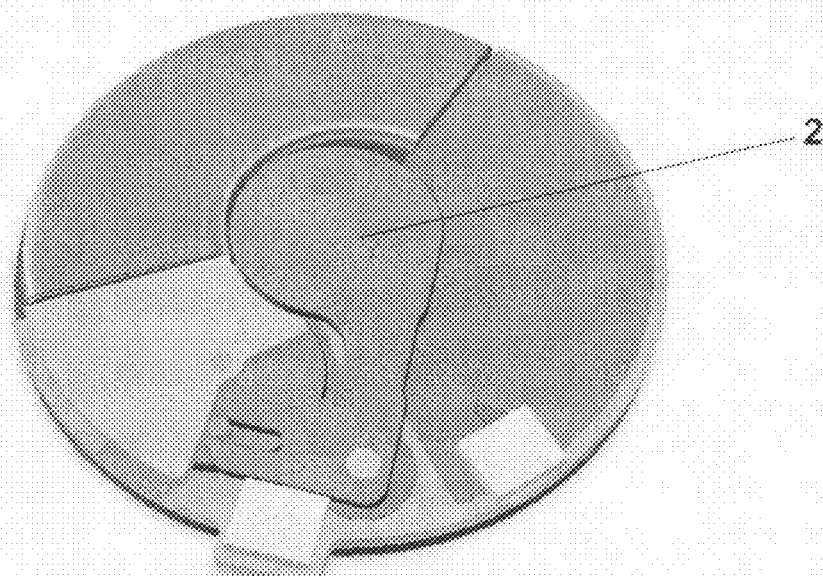
FIG. 2 shows a shutter mechanism according to a second embodiment of the invention.
Figure 3:
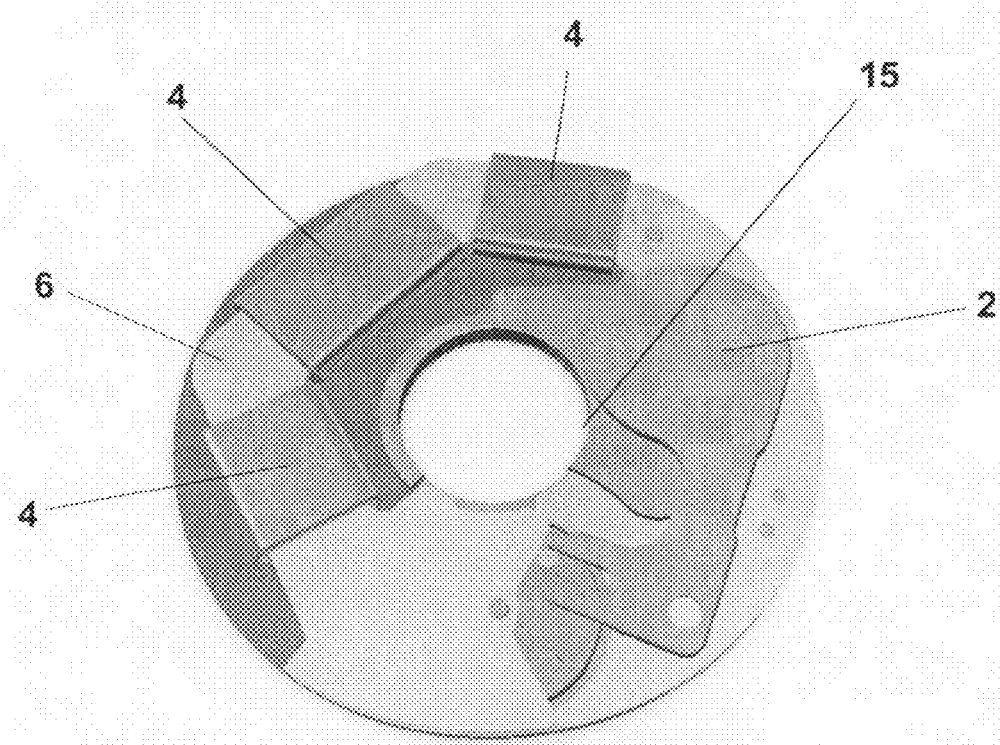
FIG. 3 shows a shutter mechanism according to a third embodiment of the invention.

FIG. 2 shows a built-up actuator mechanism of FIG. 1, whose shutter blade 2 is in the first extreme position and covers the aperture 15. FIG. 3 shows an actuator mechanism, where the shutter blade 2 is in the second extreme position and reveals the aperture 15. FIG. 2 shows an example that does not include the limit switches 14 shown in FIG. 1, and FIG. 3 shows a stator 6 where the coil 4 is divided into several parts. The limit switches 14 are attached to the stator 6. The limit switches 14 are placed in such a manner that when the shutter blade 2 is in its extreme position, the shutter blade 2 activates one limit switch 14 and frees another limit switch.

According to FIG. 3 the actuator mechanism can be composed of one or more coils 4, and similarly the stator 6 can be formed of one or more parts. Each part of the stator 6 can settle inside a different coil 4, in a suitable position in relation to the permanent magnet 8. The stator 6 shown in FIG. 1, which comprises two ends, can also be formed of two separate parts, which are placed on different sides of the permanent magnet 8, in accordance with FIG. 1. The stator 6 has a shape 17, inside which the permanent magnet 8 settles. The stator 6 of FIG. 1 can also be manufactured by coupling two or more arc-shaped parts to each other. The shape 17 operates as the pole shoe of the stator 6, the shape of which pole shoe corresponds to the shape of the permanent magnet 8, close to which the shape 17 settles. In the example the cross-section of the stator is the largest in the pole shoe. By means of the pole shoe the magnetic field is guided to the other parts of the stator 6. In the example the stator 6 comprises two pole shoes, in other words the ends of the stator 6, and between them remains the rest of the stator 6, which is a so-called yoke. The material, size and structure of the stator 6, the air slot between the permanent magnet 8 and the stator 6, the shape 17 of the pole shoe and its size are optimized from the point of view of the functionality of the magnetic field. At the pole shoe the stator can be thicker and/or wider than the rest of the stator, for example the yoke. Thus, inter alia the density of the magnetic flux and the saturation of the material are taken into account.

With reference to FIG. 4, the mutual position of the center pin 9, the driving pin 10 and the pin 3 also has an effect on how well the shutter blade 2 remains in its place even though it is affected manually or mechanically. It is important that the mechanical forces, friction forces or the forces of the magnetic field keep the shutter blade 2 in place even if the shutter blade 2 is attempted to be moved manually, for example by a finger, or it is affected by vibration. Friction forces have an effect between the driving pin 10 and the long aperture 18, which forces resist the turning of the shutter blade 2 and the movement of the driving pin 10 along the long aperture 18. In addition, due to the effect of geometry, the smaller the angle $\alpha k$ is, the greater the force needed to move the shutter blade 2 manually is. The mechanical locking of the extreme position of the shutter blade 2 is reached in a situation where the center pin 9, the driving pin 10 and the pin 3 form a right-angled triangle, in which case the angle $\alpha k$ is 0 degrees. However, it is suitable that the shutter blade 2 must be able to be opened manually without breaking the structure because of great force, and therefore, the angle $\alpha k$ is preferably larger than 0 degrees, in the example 16 to 17 degrees, more precisely 16.8 degrees. The angle $\alpha k$ is dimensioned suitably depending on how great the opening mechanical force is desired to be restricted. The opening force is also affected by whether the shutter blade is simultaneously affected by a magnetic force or other structures of the actuator mechanism.

Only one or more 4 coils is also enough to establish the magnetic field, which coils are placed in a suitable position in relation to the permanent magnet 8 in such a manner that the permanent magnet 8 is in the magnetic field of the coil 4. It is advantageous to place the coil close to the permanent magnet 8, in its immediate vicinity, also in the case that the stator 6 is in use and the size and structure of the stator varies. The amount of ferromagnetic material in the stator can be minimized by placing the coil close to the permanent magnet. When current is supplied to the coil 4, due to the force effect of the magnetic field the permanent magnet 8 turns to the desired position, simultaneously guiding the position of the shutter blade 2. The mutual location of the long aperture 18 and the driving pin 10 and the friction forces determine how well the shutter blade 2 remains in different positions, when no current is supplied to the coil 4 and when there is no magnetic field. This is affected by, inter alia, the angle $\alpha k$.

The permanent magnet 8 can also be affected by a mechanical brake 22, in accordance with FIG. 4b, which is adjustable and resists the manual rotation of the permanent magnet 8. The friction between the brake 22 and the permanent magnet 8 defines the force that is needed for rotating the permanent magnet 8. The force is, for example, smaller than the force caused by the magnetic field, which turns the permanent magnet 8 when desired. By means of the brake 22, the permanent magnet 8 is provided with two stable positions, which resist the ones shown in FIGS. 2 and 3.

Alternatively, or in addition to the brake 22, it is also possible to affect how easily the driving pin 10 moves in the long aperture 18. This is affected by the materials and pattern of the driving pin 10 and the surfaces of the aperture 18, but it is also possible to place one or more flexible arresters 23 at the aperture 18, which arresters are constructed, for example, by means of springs. The arrester 23 causes a counter-force and flexes if the force moving the driving pin 10 is great enough, for example, the force caused by the magnetic field. On the other hand, the arrester 23 aims to return to its position and to keep the driving pin 10 and at the same time the permanent magnet 8 in the desired positions, for example in the positions of FIGS. 2 and 3. By means of the arrester 23, the permanent magnet 8 is provided with two stable positions, i.e. the open and closed position of the shutter blade.

FIG. 4b also shows an example, a spring 24, by means of which the permanent magnet 8 is provided with one stable position, to which the permanent magnet 8 moves when the current supply of the coil 4 stops. The spring 24 pulls the permanent magnet 8 back to the starting position, from where the permanent magnet 8 moved due to the effect of the magnetic field. This is, for example, the closed position of the shutter blade 2. If there is a spring 24 or an arrester 23 in use, the constant maintenance of the magnetic field is not essential.

The shutter blade 2 operates preferably as a moving protection for lenses, which are in cameras and other small electronic devices, especially in phones that are equipped with camera functions. The shutter blade 2 shuts the aperture 15 so that mechanical objects and effects cannot extend their effect to, for example, the surface of the lens, which is settle behind the shutter blade 2 at the aperture 15.

The first extreme position of the shutter blade for closing the aperture 15 may be defined as strongly stable and the second extreme position of the shutter blade for opening the aperture 15 may be defined as weakly stable. The forces acting on the shutter blade are configured such that it is easier to close the shutter blade than to open it. The forces relate to the function of the brake, springs, arresters etc. of the mechanism.

FIG. 5 shows an actuator mechanism, which utilizes a shape memory alloy. Wire 104 is manufactured of the shape memory alloy, which shrinks when warming. Warming takes place by conducting current through the wire 104. The shape memory alloys are known as such, and they can also be manufactured in the form of a wire 104. The wire is placed in the form of a ring and it is so long that it circulates the frame 101 almost two times. The ring-shaped structure is especially useful, but it is possible to use other shapes as well, as long as it is ensured, that the bending of the ring does not unnecessarily add frictions, which prevent the movement of the wire 104. Also oval and elliptical shapes are possible. The ends of the wire 104 are attached from suitable points to springs 107 and 108, which in turn are attached to the frame 101. The springs 107 and 108 tighten the wire 104 and allow the movement of the ends of the wire 104 in the direction of the ring. The frame 101 is shaped like an open ring comprising two ends, between which the shutter blade 103 is located. There are slots in both ends of the frame 101, to which the springs 107 and 108 are placed. There are cavities for the springs 107 and 108 in the frame 101, wherein the springs 107 and 108 can move along with the frame 101. The first part 104a of the wire 104 extends from the spring 108 to the wire holder 113 and circulates in the frame 101 almost the entire round around the aperture 116 and the shutter blade 103. The second part 104b of the wire 104 extends from the spring 107 to the wire holder 113 and circulates in the frame 101 almost the entire round around the aperture 116 and the shutter blade 103. The wire holder 113 is attached to the wire 104, and therefore the movement of the wire 104 also moves the wire holder 113, which has a movement in the shape of an arc, whose midpoint is a bearing pin 110. The wire holder 113 is an example of driving members, which are attached to the wire and which move the other parts attached to the actuator mechanism. The more detailed configuration of the driving members can vary even widely according to needs.

The wire holder 113 is attached to the shutter blade 103. In the example, a pin 114 is used for the attachment. The shutter blade 103 is attached rotatably to the base plate 115 by means of the bearing pin 110 and a bearing 111. The shutter blade 103 has a movement that is shaped like an arc and it moves from one extreme position to another. The closable aperture 116 is located in the center of the actuator mechanism. The limit switches 109 are attached to the base plate 115 next to the frame 101 in order to diminish the thickness of the actuator mechanism. The shutter blade 103 is located next to the base plate 115, but there is a slipway 106 in between, along which the shutter blade 103 slides easily. The slipway 106 is attached to the base plate 115. In the example the slipway 106 is of small-friction plastic material.

The shutter blade 103 is kept in the two extreme positions by means of a bi-stable spring 105. The bi-stable function of the spring 105 has been created by attaching the first end of the spring 105 to the shutter blade 103 by means of a fastening pin 102 and the other end to the base plate 105 and/or the frame 101 by means of a fastening pin 112. The ends of the spring 105 form a fork and the spring 105 comprises a thread part connecting the ends, which resists both pulling the ends away from each other and taking the ends closer together.

Figure 6:
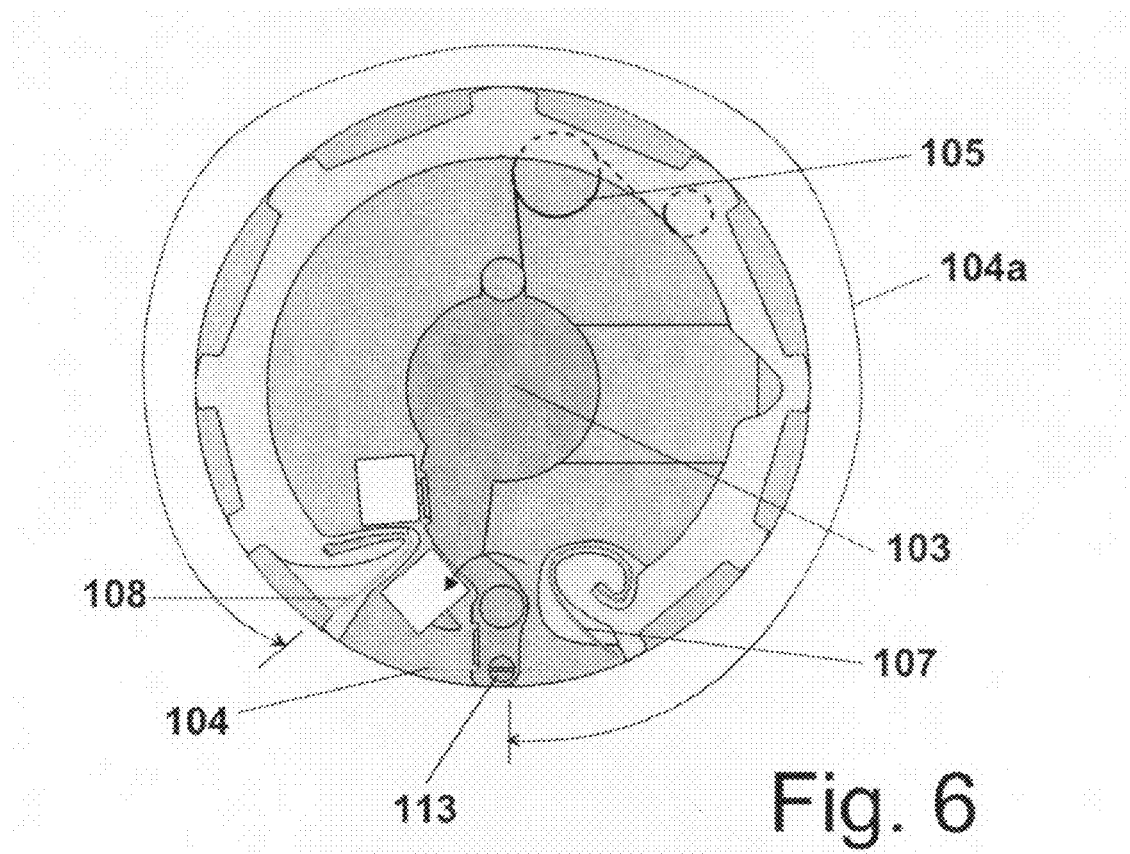
FIG. 6 shows a first stable position of an actuator mechanism and a shutter mechanism implemented with it.
Figure 7:
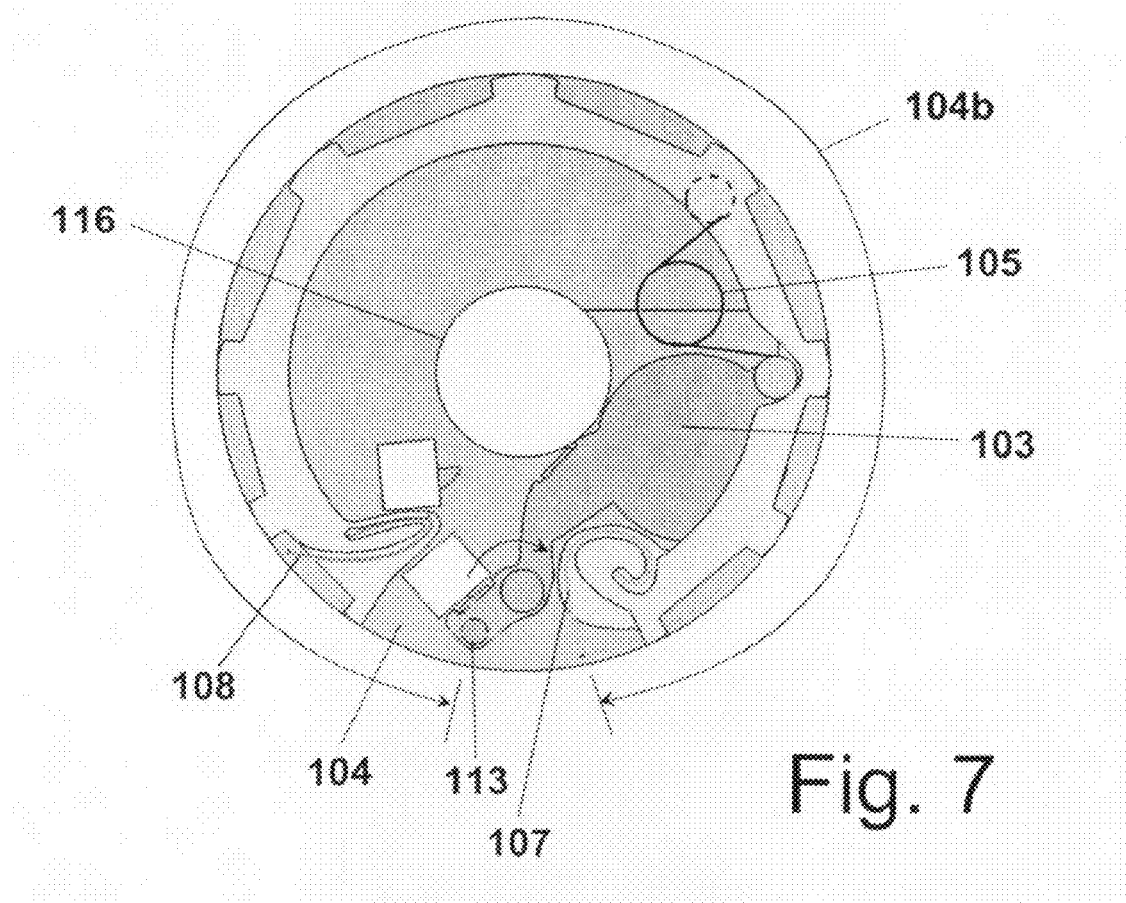
FIG. 7 shows a second stable position of an actuator mechanism and a shutter mechanism implemented with it.

FIG. 6 shows a built-up actuator mechanism of FIG. 5, whose shutter blade 103 is in the first extreme position and covers the aperture 116. FIG. 7 shows an actuator mechanism, where the shutter blade 103 is in the second extreme position and reveals the aperture 116. The limit switches 109 are placed in such a manner that when the shutter blade 103 is in the extreme position, the shutter blade 103 activates one limit switch 109 and frees another limit switch 109. The spring 105 turns with the shutter blade 103 to positions, where it maintains the position of the shutter blade 103 and resists the movement of the shutter blade 103 to another extreme position.

The wire 104 manufactured of a shape memory alloy operates in the following way. Current is supplied either between terminals 117 and 119, or between terminals 118 and 119. The terminal 119 is in the example coupled to the wire holder 113. In the situation of FIG. 6, current flows between the spring 107 and the wire holder 113, which current shortens the wire part 104b. The frame 101 holds the wire 104 in the form of a ring and prevents the diameter of the ring from decreasing, and therefore the wire part 104b pulls the spring 107. There are several guiding points in the frame 101, through which the wire 104 bends and between which the wire 104 is free so that there is little heat conduction to other structures. The spring 107 cannot bend more, because it is already bent against the frame 101, and therefore the wire part 104b pulls the wire holder 113. The traction power of the wire part 104b overcomes the holding power of the spring 105 and achieves the turning of the shutter blade 103. In the example the shutter blade 103 moves away from the aperture 116 in accordance with FIG. 7. The spring 105 assists the turning of the shutter blade 105 in the end phase and keeps the shutter blade 103 in its extreme position. When the current supply exits, the wire part 104b cools and lengthens when the spring 107 pulls the wire. The spring 107 is no longer against the frame 101 but moves because the wire 104 can now lengthen when the force of the spring 107 affects the wire 104. When the wire 104 reaches its full length, the spring 107 remains tightening the wire 104. The position of the wire holder 113 moves while the wire 104 lengthens. The spring 107 tightens the wire part 104b and pulls the wire 104 in the peripherical direction of the frame 101. The length of the wire part 104b is selected in such a manner that the movement of the wire holder 113 pulls the spring 107 to the frame 101 and the length of the wire part 104a is selected in such a manner that the antiparallel movement of the wire holder 113 pulls the spring 108 away from the frame 101.

In the situation of FIG. 7, current flows between the spring 108 and the wire holder 113, which current shortens the wire part 104a. The wire part 104a pulls the spring 108. The spring 108 cannot bend more, because it is already bent against the frame 101, and therefore the wire part 104a pulls the wire holder 113. The traction power of the wire part 104a overcomes the holding power of the spring 105 and achieves the turning of the shutter blade 103. In the example the shutter blade 103 move to cover the aperture 116 in accordance with FIG. 6. The spring 105 assists the turning of the shutter blade 105 in the end phase and keeps the shutter blade 103 in its extreme position. When the current supply exits, the wire part 104a cools and lengthens, because the spring 108 pulls the wire. The spring 108 is no longer against the frame 101 but moves because the wire 104 can now lengthen when the force of the spring 108 affects the wire 104. When the wire 104 reaches its full length, the spring 108 remains tightening the wire 104. The position of the wire holder 113 moves while the wire 104 lengthens. The spring 108 tightens the wire part 104a and pulls the wire 104 in the peripherical direction of the frame 101.

Figure 8:
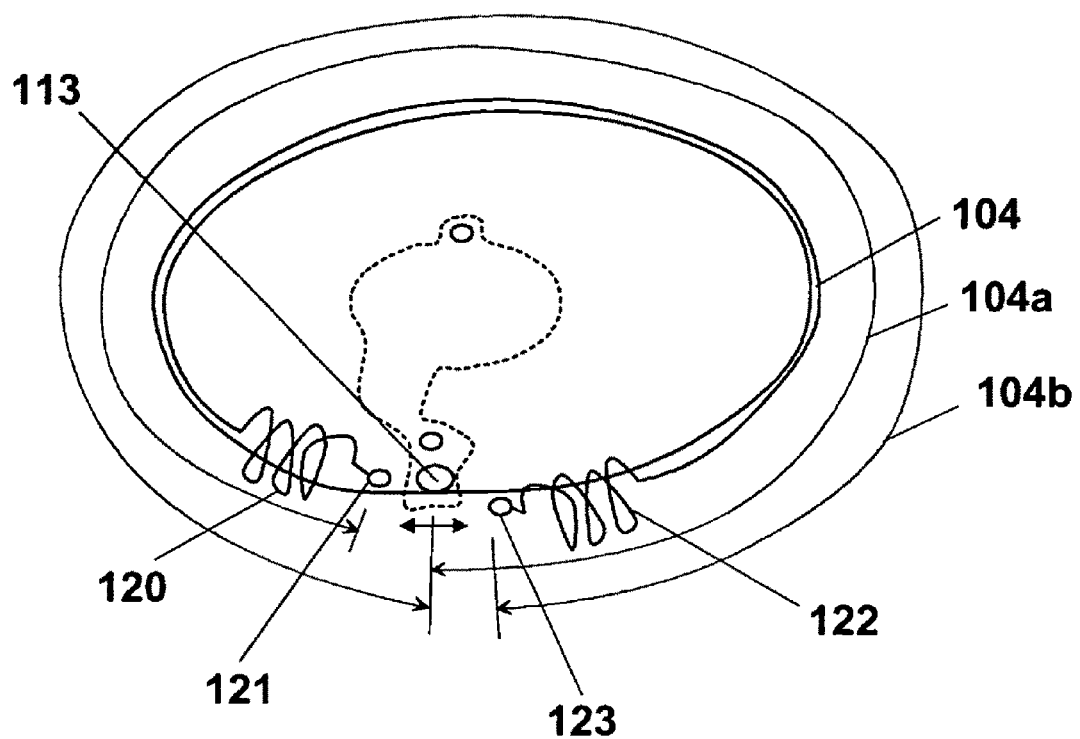
FIG. 8 shows an actuator mechanism according to a fifth embodiment of the invention.

FIG. 8 shows an alternative to the previous examples and the embodiment of FIG. 5. Springs 107 and 108 attached to the ends of the wire 104 are replaced with springs 120 and 122, which utilize shape memory alloy, which shrinks when warmed. Current supply takes place, in this example as well, to the end 121 of the spring 120 or the end 123 of the spring 122, which are attached, for example, to the frame 101 or other suitable point, in accordance with the example of FIG. 5. The operation primarily corresponds to the example of FIG. 5. The wire 104 and the springs 120 and 122 are manufactured of either separate parts or the springs 120 and 122 form an integrated assembly with the wire 104. The springs 120 and 122 are constructed and pre-tightened in such a manner that if current supply takes place over wire portion 104a, the spring 120 tightens and at the same time the spring 122 keeps the wire 104 tight and the position of the wire holder 113 changes. When the current supply ends, the spring 122 remains tightened. Correspondingly, if current supply takes place over wire portion 104b, the spring 122 tightens and at the same time the spring 120 keeps the wire 104 tight and the position of the wire holder 113 changes again. When the current supply ends, the spring 120 remains tightened. The position of the shutter blade and the bi-stable spring changes as described above.

The springs 120 and 122 are, for example, coil springs, which are manufactured by winding wire 104 or corresponding material, which is attached to the wire 104. Other configurations of the springs 120 and 122 than a coil are possible.

Figure 9:
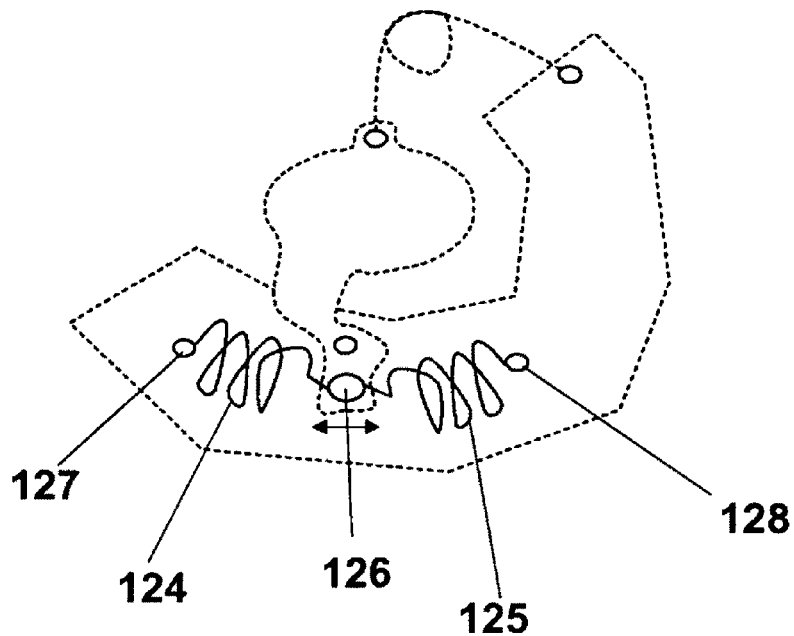
FIG. 9 shows an actuator mechanism according to a sixth embodiment of the invention.

FIG. 9 shows yet another alternative compared to the previous examples. The shown alternative can be attached to a suitable frame. The structure according to the example becomes very compact and small. Wire 104 according to FIG. 8 is not used, but only two springs 124 and 125, which utilized a shape memory alloy that shrinks when warmed. The operation of the springs 124, 125 corresponds to the springs 120 and 122 shown in FIG. 8, but the springs 124 and 125 are coupled directly to one or more suitable driving members 126, which is, for example, an attachment member, with which the springs 124, 125 attach, for example, to a shutter blade being driven. Current supply takes place, in this example as well, to the end 124 of the spring 127 or the end 125 of the spring 128, which are attached, for example, to the frame. Electric current runs between each end of the springs, via the driving members 126, which is coupled to be a part of the electric circuit. The spring, to which electricity is supplied, shortens and pulls the other spring, thus moving the driving members 126 in the desired direction. By supplying electricity to the other spring, the driving members 126 are made to move in the opposite direction. The position of the shutter blade and the bi-stable spring changes as described above. The springs 124 and 125 are, for example, coil springs, but other such configurations are possible, which operate according to the above.

The above-described examples of actuator mechanisms and their details can also be implemented in combinations, if necessary, from the point of view of the structure or optimization and functionality of the shutter mechanism. Thus, for example, the structures of FIGS. 4a and 4b can be applied with the structures according to FIG. 1, and, for example, the structures of FIGS. 8 and 9 can be applied with the structures according to FIG. 5. The more detailed placement of different parts in the structure varies and it is optimized in order to achieve, for example, the desired geometry or a compact size.

The invention is not limited solely to the above-presented examples, but it can be varied within the scope of the appended claims.

The invention claimed is:

1. An actuator mechanism comprising:
a wire manufactured of a shape memory alloy configured to shrink when heated, and
driving members coupled to said wire and configured to drive members connected to the actuator mechanism, the actuator mechanism comprising first and second wires manufactured of a shape memory alloy that shrinks when heated and configured as respective two springs, wherein the first wire is configured to move the driving members in a first direction and the second wire is configured to move the driving members in a second direction that is opposite to the first direction.

2. An actuator mechanism comprising:
a wire manufactured of a shape memory alloy configured to shrink when heated, and
driving members coupled to said wire and configured to drive members connected to the actuator mechanism, the actuator mechanism further comprising two springs, which are located at opposite ends of the wire and which are configured tighten the wire and allow the wire to turn from the first extreme position to the second extreme position and back.

3. The actuator mechanism according to claim 2, wherein at least one of said two springs is integrated with the wire or attached to the wire.

4. The actuator mechanism according to claim 2, wherein at least one of said two springs is a coil spring or a bendable wire that is configured to return to its position.

5. The actuator mechanism according to claim 2, further comprising a frame configured to support the wire and to guide the wire to turn from a first extreme position to a second extreme position and back guided by the shrinking.

6. The actuator mechanism according to claim 2, further comprising a bi-stable spring, which is coupled to said members and which has a first position configured to maintain the first extreme position of said members and a second position configured to maintain the second extreme position of said members.

7. The actuator mechanism according to claim 2, wherein the driving members comprise a wire holder configured to wrap the wire around the wire holder into a loop, when the wire arrives and tangentially in relation to the wire holder.

8. A shutter mechanism comprising:
a wire manufactured of a shape memory alloy configured to shrink when heated,
a frame configured to support the wire and guide the wire to turn from a first extreme position to a second extreme position and back guided by the shrinking,
two springs located at opposite ends of the wire and configured to tighten the wire and allow the wire to turn from the first extreme position to the second extreme position and back,
a turning shutter blade, which has a first extreme position, wherein the shutter blade is configured to close an aperture, and a second extreme position, wherein the shutter blade is configured to reveal the aperture, and driving members configured to couple to each other the rotating wire and the turning shutter blade and to turn the shutter blade driven by the wire.

9. The shutter mechanism according to claim 8, further comprising a bi-stable spring coupled to the shutter blade and having a first position that maintains the first extreme position of the shutter blade and a second position, which maintains the second extreme position of the shutter blade.

10. The shutter mechanism according to claim 8, wherein the frame is ring-shaped and comprises two ends, to which slots and cavities are formed configured to attach the springs and to allow moving of the springs.

11. The shutter mechanism according to claim 10, wherein the driving members and the turning point of the shutter blade are located between said two ends.

12. The shutter mechanism according to claim 8, wherein the frame comprises several guiding points located in the ring-shaped frame, and through which guiding points the wire is configured to run by bending and between which guiding points the wire is allowed to run freely.

13. The shutter mechanism according to claim 8, wherein the wire is wrapped into a ring and comprises almost two full rounds and the driving members are coupled to the center part of the wire.

14. The shutter mechanism according to claim 8, wherein the shutter mechanism further comprises a base plate comprising an aperture in the middle of the base plate, and to which base plate the frame is attached and to which base plate the shutter blade is rotatably coupled.

15. The shutter mechanism according to claim 8, further comprising current supply terminals coupled to each spring and driving members.

16. The shutter mechanism according to claim 8, wherein the driving members comprise a wire holder, around which the wire is wrapped into a loop, when the wire arrives tangentially in relation to the wire holder.

17. A method in an actuator mechanism, comprising:
supporting a wire, which wire is manufactured of a shape memory alloy, into a desired shape by allowing variations in the length of said wire,
maintaining wire tightening forces by springs, which are located at both ends of the wire,
switching on current between one end of the wire and the center part of the wire, which current shrinks the wire, and
moving driving members attached to the center part of the wire as a result of the shortening of the length of the wire and by maintaining one end at its place.

18. The method according to claim 17, further comprising: turning the shutter blade via the driving members, wherein the driving members are coupled to the shutter blade rotating around the turning point.

19. Apparatus, comprising:
a support configured to support a wire, which wire is manufactured of a shape memory alloy, into the desired shape by allowing variations in the length of said wire,
a wire tensioner configured to maintain wire tightening forces by springs, which are located at both ends of the wire,
a switch configured to switch on current between one end of the wire and the center part of the wire, which current shrinks the wire, and
a force member configured to move driving members attached to the center part of the wire as a result of the shortening of the length of the wire and by maintaining one end at its place.

20. The apparatus of claim 19, further comprising an element configured to turn the shutter blade via the driving members, wherein the driving members are coupled to the shutter blade rotating around the turning point.

* * * * *